(12) United States Patent
Suzuki et al.

(10) Patent No.: US 10,971,095 B2
(45) Date of Patent: Apr. 6, 2021

(54) LIQUID CRYSTAL DISPLAY DEVICE AND FAILURE INSPECTION METHOD

(71) Applicants: PANASONIC CORPORATION, Osaka (JP); PANASONIC LIQUID CRYSTAL DISPLAY CO., LTD., Hyogo (JP); PANASONIC SEMICONDUCTOR SOLUTIONS CO., LTD., Nagaokakyo (JP)

(72) Inventors: Jun Suzuki, Kanagawa (JP); Akihiro Yoshizawa, Kanagawa (JP); Hideki Nozaki, Kanagawa (JP); Satoshi Endou, Osaka (JP); Kenji Fukuta, Osaka (JP); Hiroaki Goto, Osaka (JP)

(73) Assignees: PANASONIC CORPORATION, Osaka (JP); PANASONIC LIQUID CRYSTAL DISPLAY CO., LTD., Hyogo (JP); PANASONIC SEMICONDUCTOR SOLUTIONS CO., LTD., Kyoto (JP)

( * ) Notice: Subject to any disclaimer, the term of this patent is extended or adjusted under 35 U.S.C. 154(b) by 46 days.

(21) Appl. No.: 16/345,890

(22) PCT Filed: Oct. 26, 2017

(86) PCT No.: PCT/JP2017/038616
§ 371 (c)(1),
(2) Date: Apr. 29, 2019

(87) PCT Pub. No.: WO2018/079636
PCT Pub. Date: May 3, 2018

(65) Prior Publication Data
US 2019/0279585 A1    Sep. 12, 2019

(30) Foreign Application Priority Data

Oct. 31, 2016 (JP) .............................. JP2016-213406
Mar. 30, 2017 (JP) .............................. JP2017-068124
Jun. 26, 2017 (JP) .............................. JP2017-124558

(51) Int. Cl.
*G09G 3/36* (2006.01)
*G02F 1/133* (2006.01)
(Continued)

(52) U.S. Cl.
CPC ......... *G09G 3/3648* (2013.01); *G02F 1/1309* (2013.01); *G02F 1/13306* (2013.01);
(Continued)

(58) Field of Classification Search
CPC ........ G09G 3/3648; G09G 3/20; G09G 3/006; G09G 2380/10; G09G 2310/0297;
(Continued)

(56) References Cited

U.S. PATENT DOCUMENTS 6,100,865 A    8/2000 Sasaki
6,624,857 B1   9/2003 Nagata et al.
(Continued)

FOREIGN PATENT DOCUMENTS

JP    10-082814       3/1998
JP    10-097203 A     4/1998
(Continued)

OTHER PUBLICATIONS

The partial suppernentary European search report (R.164 EPC) dated Jul. 9, 2019 for the related European Patent Application No. 17865463.8.
(Continued)

*Primary Examiner* — Akm Zakaria
(74) *Attorney, Agent, or Firm* — Greenblum & Bernstein, P.L.C.

(57) ABSTRACT

A liquid crystal display includes source lines and gate lines, pixel electrodes, switching elements, a source driver, a gate driver, and a failure inspection circuit. The source lines and
(Continued)

the gate lines are disposed in a lattice form. The pixel electrode is disposed in a pixel region defined by the source line and the gate line. The switching element is disposed corresponding to the pixel electrode. The source driver drives the source lines. The gate driver drives the gate lines. The failure inspection circuit is connected to the source lines or the gate lines, and performs inspection of the source lines or the gate lines. The failure inspection circuit includes monitor input signal lines, monitor output signal lines, a determination circuit that detects voltage levels of output signals from the monitor output signal lines, and an expected value comparison circuit that compares outputs from the determination circuit with expected values.

10 Claims, 16 Drawing Sheets

(51) Int. Cl.
*G02F 1/1362* (2006.01)
*G09G 3/00* (2006.01)
*G02F 1/13* (2006.01)
*G09G 3/20* (2006.01)

(52) U.S. Cl.
CPC ....... *G02F 1/136286* (2013.01); *G09G 3/006* (2013.01); *G09G 3/20* (2013.01); *G02F 2001/136254* (2013.01); *G09G 2310/0297* (2013.01); *G09G 2330/12* (2013.01); *G09G 2380/10* (2013.01)

(58) Field of Classification Search
CPC .............. G09G 2330/12; G02F 1/1309; G02F 1/13306; G02F 1/136286; G02F 2001/136254

See application file for complete search history.

(56) References Cited

U.S. PATENT DOCUMENTS

| | | | |
|---|---|---|---|
| 2002/0140650 A1* | 10/2002 | Kai | ................... G09G 3/3688 345/87 |
| 2004/0017531 A1 | 1/2004 | Nagata et al. | |
| 2005/0046439 A1 | 3/2005 | Yu | |
| 2006/0279667 A1* | 12/2006 | Tsai | ................... G02F 1/13454 349/40 |
| 2007/0290708 A1* | 12/2007 | Takatori | ............... G01R 31/319 324/750.3 |

FOREIGN PATENT DOCUMENTS

| | | |
|---|---|---|
| JP | 2005-069858 | 3/2005 |
| JP | 2005-122209 | 5/2005 |

OTHER PUBLICATIONS

Office Action, dated Jun. 9, 2020 from the European Patent Office (EPO) in the corresponding European Patent Application No. 17 865 463.8.

Offical Communication issued in International Patent Application No. PCT/JP2017/038616, dated Jan. 30, 2018, along with English-language translation.

* cited by examiner

LIQUID CRYSTAL DISPLAY DEVICE AND FAILURE INSPECTION METHOD

This application is a U.S. national stage application of the PCT International Application No. PCT/JP2017/038616 filed on Oct. 26, 2017, which claims the benefit of foreign priority of Japanese patent application No. 2016-213406, 2017-068124 and 2017-124558 filed on Oct. 31, 2016, Mar. 30, 2017 and Jun. 26, 2017 the contents all of which are incorporated herein by reference.

TECHNICAL FIELD

The present invention relates to a liquid crystal display having a liquid crystal panel of an active matrix type and a failure inspection method of the liquid crystal display.

BACKGROUND ART

In recent years, on-vehicle liquid crystal display is used in not only a car navigation but also an instrument panel in which meters such as a speed meter, a tachometer, a water temperature meter, and the like are embedded. In the instrument panel to which the liquid crystal display is applied, the liquid crystal display displays not only the meters but also a warning for notifying abnormality of a device mounted on a vehicle (e.g., an on-vehicle device such as a brake or an air bag) with a warning icon, for example (refer to FIG. 1). In display screen D1 illustrated in FIG. 1, speed meter SM, tachometer TM, warning icon WI, and other information are displayed.

When the liquid crystal display is applied to the instrument panel in this manner, in general, warning lamps WLs similar to a conventional type are disposed adjacent to display screen D1. With this configuration, even when the liquid crystal display fails and warning display region where warning icon WI is to be displayed is incapable of displaying, abnormality of the on-vehicle device is notified with warning lamps WLs, so that safety of occupants can be secured (fail-safe property).

CITATION LIST

Patent Literature

PTL 1: Unexamined Japanese Patent Publication No. 2005-122209

SUMMARY OF THE INVENTION

The present invention provides a liquid crystal display and a failure inspection method capable of performing self-diagnosis of a failure (open abnormality and short-circuit abnormality of a source line and/or a gate line) of a liquid crystal panel with a simple circuit configuration.

A liquid crystal display according to an aspect of the present invention includes a first substrate, a second substrate disposed opposite to the first substrate, and a liquid crystal panel of an active matrix type including a liquid crystal layer sealed between the first substrate and the second substrate. The liquid crystal display includes a source line and a gate line, a pixel electrode, a switching element, a source driver, a gate driver, and a failure inspection circuit. The source line and the gate line are disposed in a lattice form. The pixel electrode is disposed in a pixel region defined by the source line and the gate line. The switching element is disposed corresponding to the pixel electrode. The source driver drives the source line. The gate driver drives the gate line. The failure inspection circuit is connected to the source line or the gate line, and performs inspection of the source line or the gate line. The failure inspection circuit includes a monitor input signal line, a monitor output signal line, a determination circuit that detects a voltage level of an output signal from the monitor output signal line, and an expected value comparison circuit that compares an output from the determination circuit with an expected value.

A failure inspection method according to another aspect of the present invention is a failure inspection method of the above-described liquid crystal display, the failure inspection method including performing failure inspection of a gate line based on an output signal when a gate signal from a gate driver is applied during an image display period.

A failure inspection method according still another aspect of the present invention is a failure inspection method of the above-described liquid crystal display, the failure inspection method including performing failure inspection of a source line during a blanking period between a plurality of image display periods.

According to the present invention, self-diagnosis of a failure of a liquid crystal panel can be performed with a simple circuit configuration.

DESCRIPTION OF EMBODIMENTS

Prior to describing exemplary embodiments of the present invention, problems found in conventional techniques will be briefly described. As described above, in the conventional configuration, even though the failure of the on-vehicle device can be warned with the liquid crystal display, the warning lamps are also disposed. This increases a device cost for those warning lamps. Further, when the liquid crystal display fails, to determine whether the failure occurs in the liquid crystal panel or in the controller, it is necessary to disassemble the liquid crystal display and to perform inspection of the liquid crystal display using a dedicated inspection device. This complicates an inspection process.

Meanwhile, in a liquid crystal panel of an active matrix type, a failure inspection circuit (hereinafter, referred to as an "initial failure inspection circuit") for performing lighting inspection for each pixel is disposed at a perimeter of a display region. This circuit is used for inspecting whether the liquid crystal panel operates correctly, before driver integrated circuits (ICs) (a source driver and a gate driver) are mounted (for example, PTL 1). However this initial failure inspection circuit is used only for failure inspection at a manufacturing stage, and cannot be used after the driver ICs are mounted, for example, during image display of the liquid crystal display.

The exemplary embodiments of the present invention will be described in detail below with reference to the drawings.

First Exemplary Embodiment

Figure 1:
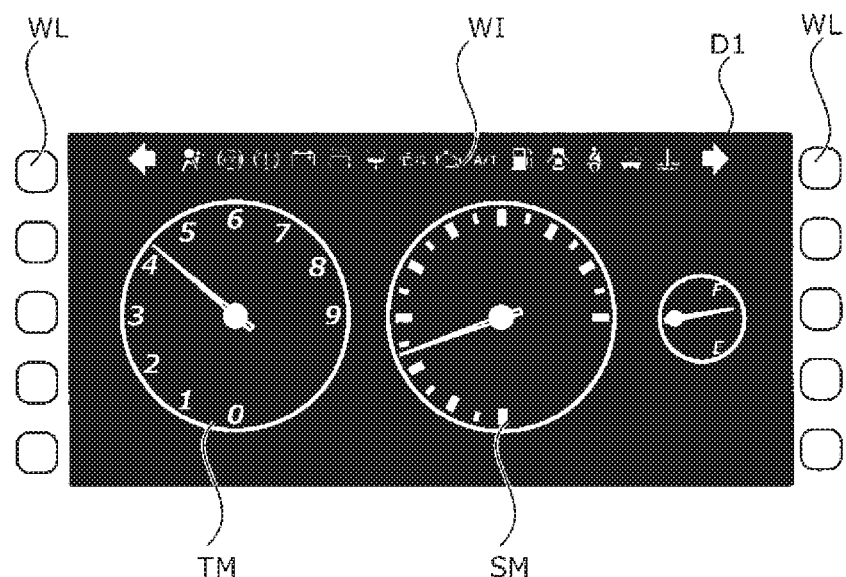
FIG. 1 is a diagram illustrating one example of an instrument panel to which a liquid crystal display is applied.
Figure 2:
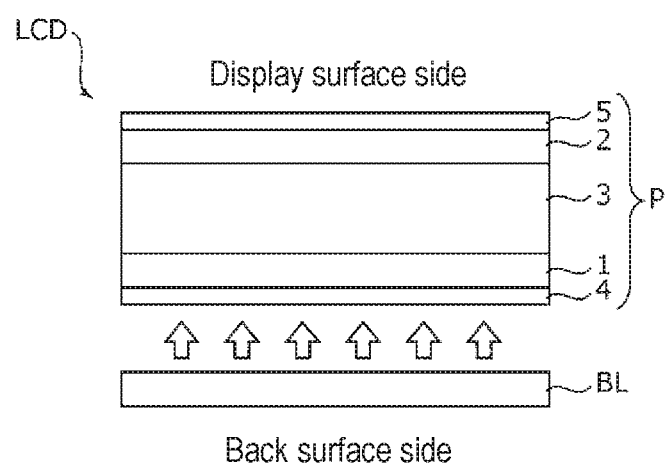
FIG. 2 is a diagram illustrating one example of a liquid crystal display according to one exemplary embodiment of the present invention.

FIG. 2 is a diagram illustrating one example of a liquid crystal display (LCD) according to one exemplary embodiment of the present invention.

Liquid crystal display LCD is applied to an instrument panel of a vehicle, for example, and displays meters or an abnormality warning of an on-vehicle device.

As illustrated in FIG. 2, liquid crystal display LCD includes liquid crystal panel P and backlight BL disposed on a back surface side of liquid crystal panel P. Liquid crystal panel P includes active matrix substrate 1 (first substrate), opposite substrate 2 disposed opposite to active matrix substrate 1 (second substrate), and liquid crystal layer 3 sealed between active matrix substrate 1 and opposite substrate 2. Active matrix substrate 1 and opposite substrate 2 are substrates made of glass, for example. Polarizing plate 4 is disposed on a back surface side of active matrix substrate 1. Polarizing plate 5 is disposed on a front surface side of opposite substrate 2. Opposite substrate 2 includes an opposite electrode (common electrode) and a color filter (neither are illustrated), for example. A detailed configuration of active matrix substrate 1 will be described later.

Figure 3:
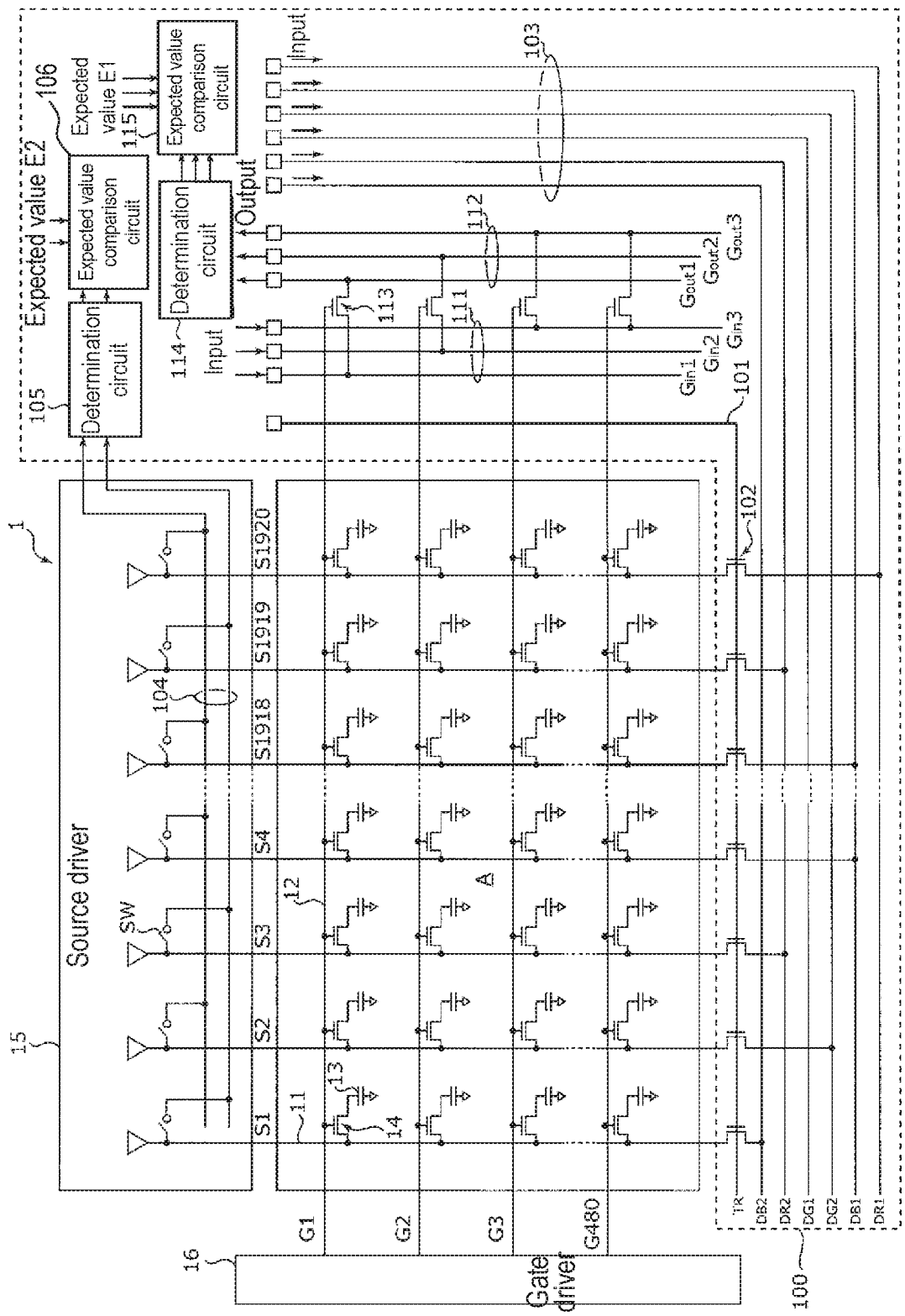
FIG. 3 is a diagram illustrating one example of a circuit configuration of an active matrix substrate according to a first exemplary embodiment.

FIG. 3 is a diagram illustrating one example of a circuit configuration of active matrix substrate 1 according to a first exemplary embodiment. As illustrated in FIG. 3, active matrix substrate 1 includes source lines 11 (data lines) and gate lines 12 (scanning lines) that are disposed in a lattice form, pixel electrodes 13 (sub-pixel electrodes) respectively disposed in pixel regions defined by source lines 11 and gate lines 12, switching elements 14 disposed corresponding to pixel electrodes 13, source driver 15 that drives source lines 11, gate driver 16 that drives gate lines 12, and failure inspection circuit 100.

Active matrix substrate 1 according to the present exemplary embodiment is a substrate used for a video graphics array (VGA) panel (640×480 pixels), and includes 1920 source lines 11 and 480 gate lines 12. The pixel region defined by source line 11 and gate line 12 is a sub-pixel region for each of R, G, and B (red, green, and blue). Three sub-pixel regions adjacent to one another in a horizontal direction (gate line direction) configure one pixel region.

Switching element 14 is a thin film transistor (TFT) including a gate electrode, a source electrode, and a drain electrode. In switching element 14, the gate electrode is connected to gate line 12, the source electrode is connected to source line 11, and the drain electrode is connected to one end of pixel electrode 13. The other end of pixel electrode 13 is connected to an opposite electrode (its reference sign is omitted) through liquid crystal layer 3.

Figure 4:
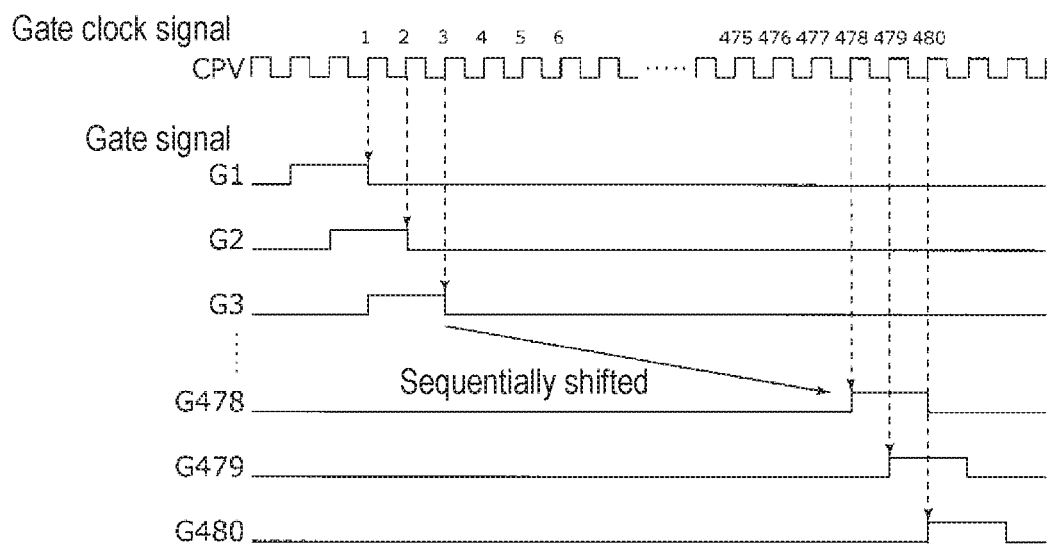
FIG. 4 is a timing chart illustrating one example of a drive operation of a gate driver.

Source driver 15 and gate driver 16 are disposed at a perimeter of the pixel regions. To sequentially turn on switching elements 14, gate driver 16 sequentially applies a pulse-like voltage to gate lines 12. Herein, as illustrated in FIG. 4, gate driver 16 operates while shifting every one clock with a width of two clocks.

Figure 5:
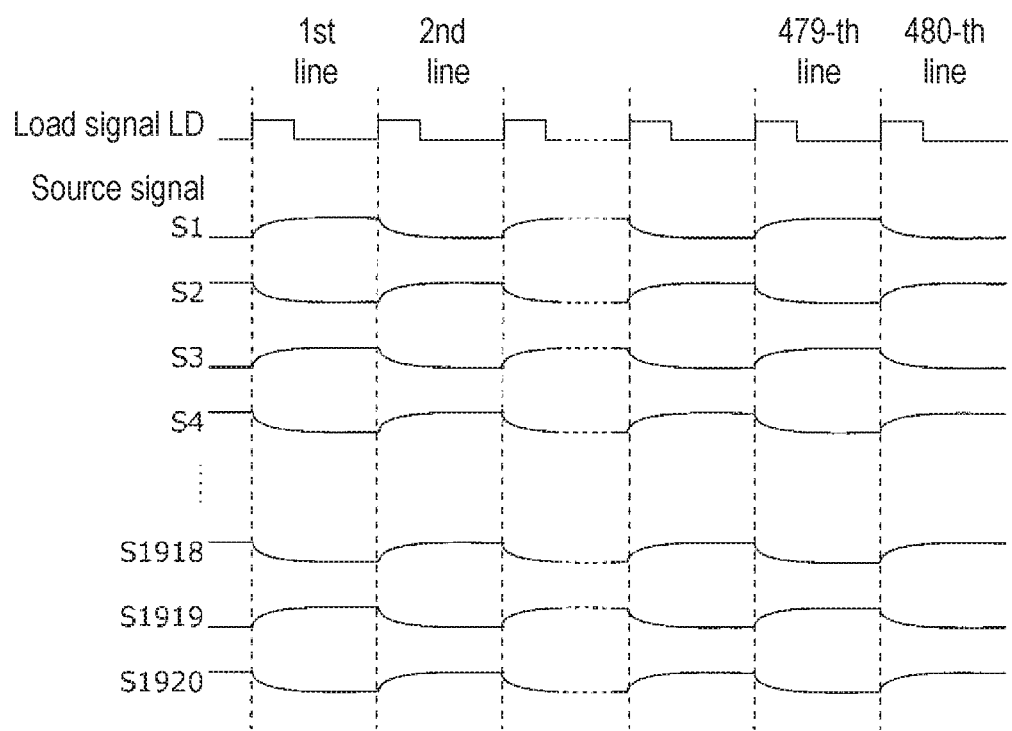
FIG. 5 is a timing chart illustrating one example of a drive operation of a source driver.

Source driver 15 supplies a voltage to be applied to liquid crystal layer 3 through switching elements 14 that are turned on (refer to FIG. 5). With this configuration, pixels corresponding to turned-on switching elements 14 are lighted.

Specifically, source driver 15 converts an image signal (digital color data) received from an LCD controller (not illustrated) into an analogue voltage, and outputs the converted analogue voltage through source line 11 at rise timing of load signal LD. This voltage is applied to pixel electrode 13 through switching element 14. The voltage applied to pixel electrode 13 is determined at the fall of the gate signal (refer to FIG. 6). Capacitance of liquid crystal layer 3 itself allows the voltage to be held until next writing. This voltage varies light transmittance in liquid crystal layer 3, so that a color corresponding to the light transmittance is displayed.

Figure 6:
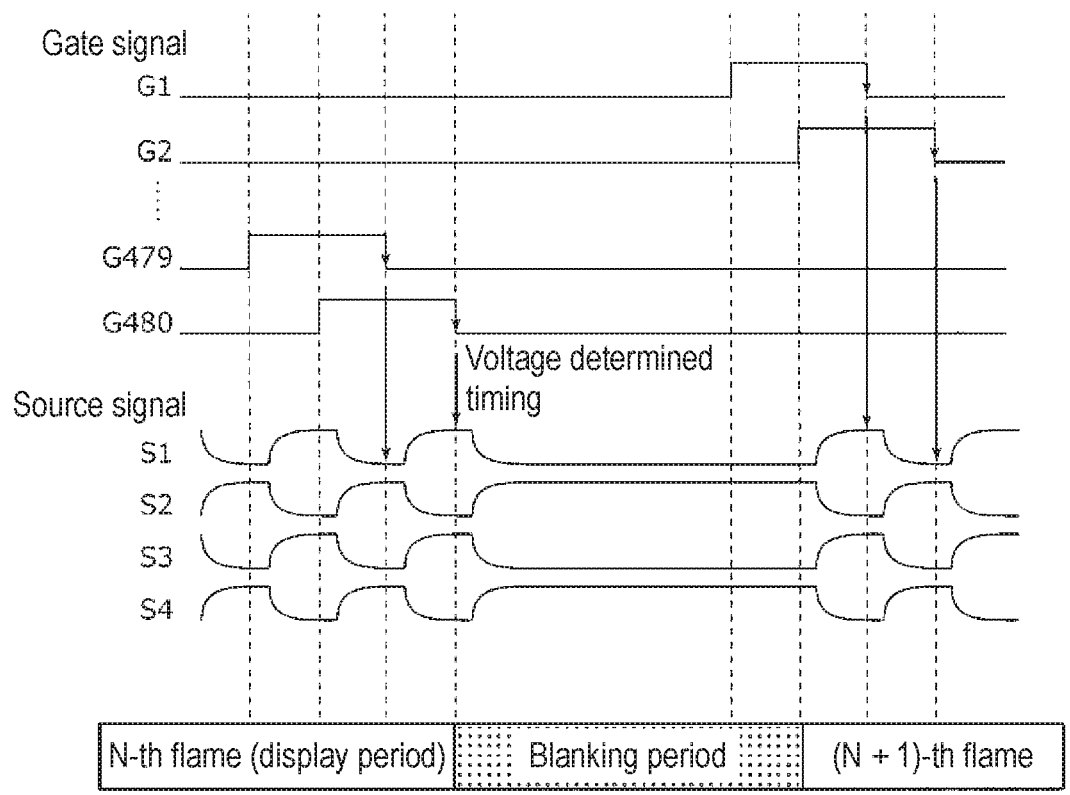
FIG. 6 is a timing chart illustrating one example of a relationship between the drive operations of the gate driver and the source driver and image display.

As illustrated in FIG. 6, a blanking period (vertical retrace period) is interposed between a display period of a certain flame and a display period of the next flame. The gate signal is turned off during the blanking period. Therefore even when the output of the source driver fluctuates, the display is not affected.

In the present exemplary embodiment, failure inspection of source lines 11 is performed during the blanking period. Note that, when failure inspection of all source lines 11 during one blanking period is difficult, it is preferable to inspect the display region generally by thinning out source lines 11 with predetermined intervals. Alternatively, the failure inspection of gate lines 12 can be performed during the image display.

Failure inspection circuit 100 includes predetermined wiring patterns L1 and L2 (refer to FIGS. 7 and 9), determination circuits 114 and 105 that respectively detect voltage levels from wiring patterns L1 and L2, expected value comparison circuits 115 and 106 that respectively compare outputs from determination circuits 114 and 105 with expected values. Failure inspection circuit 100 performs inspection of source lines 11 or gate lines 12 by using source driver 15 or gate driver 16. Comparison results of expected value comparison circuits 115 and 106 are output to the LCD controller (not illustrated) or a computer. The LCD controller or the computer performs predetermined processing based on the comparison results.

In the present exemplary embodiment, failure inspection circuit 100 includes first failure inspection circuit 100A (refer to FIG. 7) that performs inspection of gate lines 12 and second failure inspection circuit 100B (refer to FIG. 9) that performs inspection of source lines 11.

Figure 7:
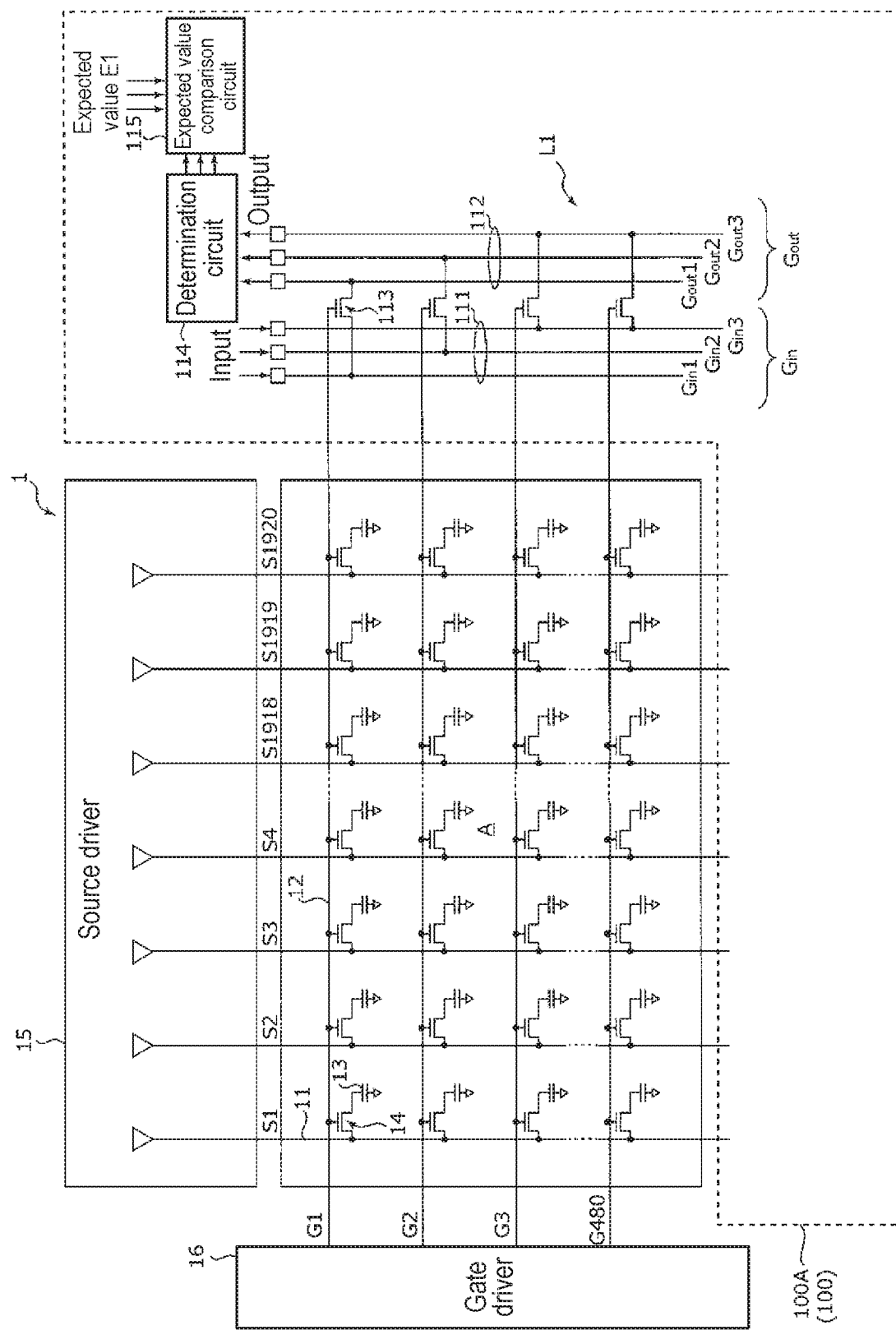
FIG. 7 is a diagram illustrating one example of a circuit configuration for inspecting for open abnormality and short-circuit abnormality in gate lines.

FIG. 7 is a diagram illustrating one example of a circuit configuration for inspecting for open abnormality (open circuit) and short-circuit abnormality (short circuit) in gate lines 12. As illustrated in FIG. 7, first failure inspection circuit 100A includes first wiring patterns L1, first determination circuit 114, and first expected value comparison circuit 115. At least one of first determination circuit 114 and first expected value comparison circuit 115 may be embedded in gate driver 16.

First wiring patterns L1 include first monitor input signal lines 111, first monitor output signal lines 112, and first switching elements 113. First monitor input signal lines 111 receive first monitor input signals Gin (Gin1 to Gin3) for inspecting gate lines 12. First monitor output signal lines 112 output first monitor output signals Gout (Gout1 to Gout3) based on first monitor input signals Gin, to first determination circuit 114. First switching elements 113 are transistors each including a gate electrode, a source electrode, and a drain electrode. In first switching element 113, the gate electrode is connected to an end of gate line 12 opposite to gate driver 16, the drain electrode is connected to first monitor input signal line 111, and the source electrode is connected to monitor output signal line 112.

Figure 8:
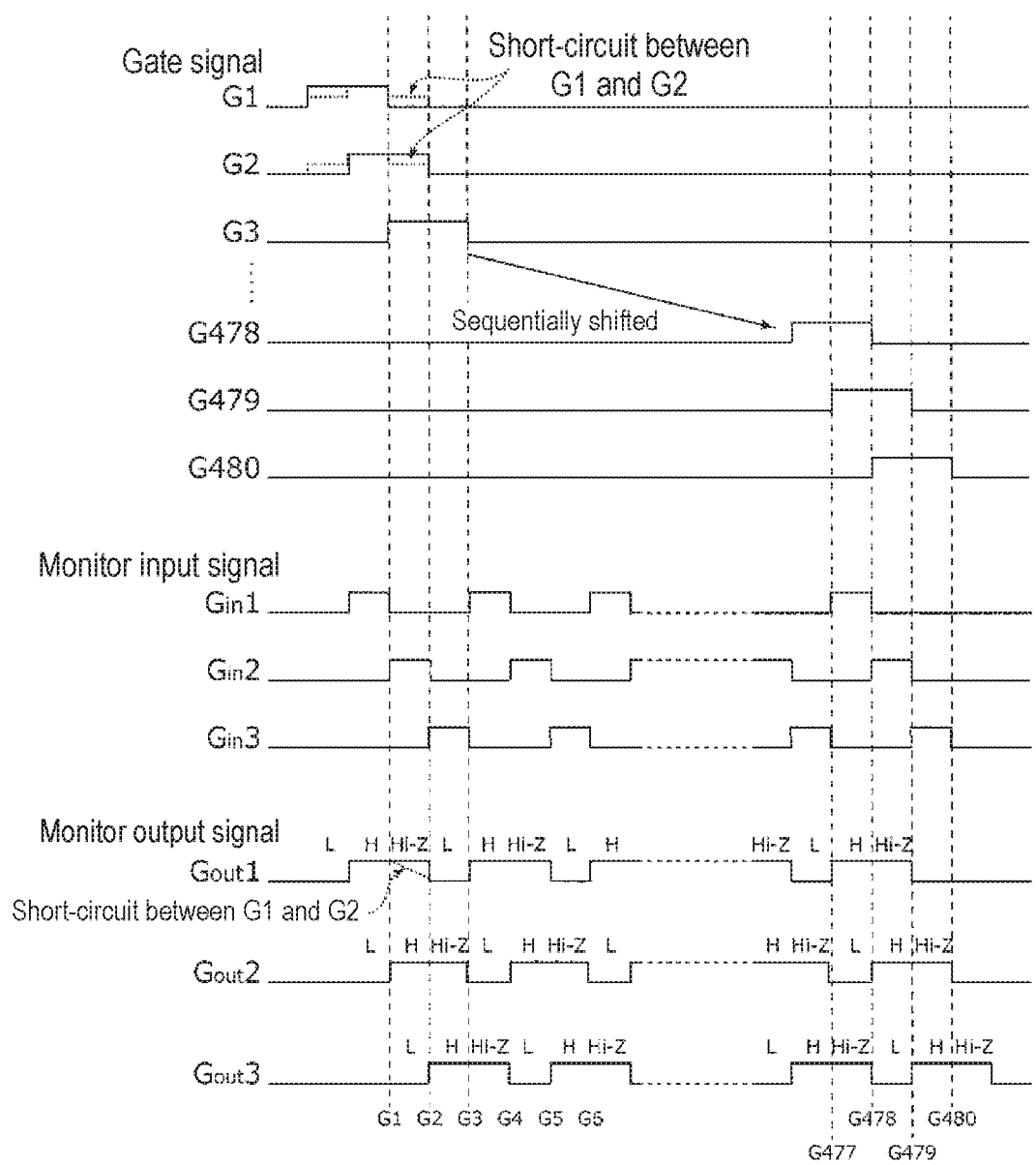
FIG. 8 is a timing chart illustrating one example of a failure inspection result of the gate lines.

FIG. 8 is a timing chart illustrating one example of a failure inspection result of the gate lines. First monitor output signals Gout illustrated in FIG. 8 are voltage levels input to first determination circuit 114. When voltage levels to be obtained when gate lines 12 are normal are defined as first expected values E1, first expected value comparison circuit 115 determines open abnormality and short-circuit abnormality in gate lines 12 by comparing voltage levels detected by first determination circuit 114 with first expected values E1. Note that failure inspection of gate lines 12 is performed by utilizing an operation for driving gate lines 12 during the image display, for example.

As illustrated in FIG. 8, gate signals G1 to G480 operate while shifting every one clock with a width of two clocks. Gate lines 12 that receive gate signals G are to be inspected. In other words, first switching elements 113 whose gate electrodes are connected to gate lines 12 are turned on, and first monitor input signals Gin each of which has a width of one clock are input from first monitor input signal lines 111 connected to first switching elements 113 thus turned on. First monitor output signals Gout according to first monitor input signals Gin from first monitor input signal lines 111 are output to first determination circuit 114 through first monitor output signal lines 112.

As illustrated in FIG. 8, when short-circuit abnormality and open abnormality do not occur in gate lines 12 to be inspected, according to first monitor input signal Gin being input and to a voltage level of first monitor input signal Gin turning to "high", a voltage level of corresponding first monitor output signal Gout also turns to "high". The voltage level of first monitor output signal Gout is held until next gate signal G is input. For example, during gate signal G1 being input, when first monitor input signal Gin1 is input to first monitor input signal line 111, the voltage level of first monitor output signal Gout1 turns to "high". When next gate signal G4 is input, since the voltage level of first monitor input signal Gin1 at this time is "low", the voltage level of first monitor output signal Gout1 turns to "low".

Meanwhile, when open abnormality occurs in gate line 12, even though gate signal G is input through gate line 12, first switching element 113 is not turned on. Accordingly, even when first monitor input signal Gin is input, the voltage level of first monitor output signal Gout is kept "low". This allows first expected value comparison circuit 115 to detect open abnormality in gate line 12.

In contrast, when short-circuit abnormality occurs in gate line 12, the voltage level of first monitor output signal Gout is decreased during a period when the voltage level should be held as "high". For example, as illustrated in FIG. 8, when the voltage level of gate signal G1 turns to "low", first switching element 113 is turned off, and the voltage level of first monitor output signal Gout1 should be held as "high". However, gate line 12 to which gate signal G1 is input and adjacent gate line 12 to which gate signal G2 is input are short-circuited, voltage levels of two gate lines 12 turn to an intermediate value between voltage levels input to respective gate lines 12. Hence, due to input of gate signal G2, a voltage level of first switching element 113 that outputs first monitor output signal Gout1 also turns to a voltage level between "high" and "low", and as a result, first switching element 113 is not turned off, but takes an unstable state. At this time, since first monitor input signal Gin1 is not input, the voltage level of first monitor output signal Gout1 is decreased. This allows first expected value comparison circuit 115 to detect short-circuit abnormality in gate line 12.

Figure 9:
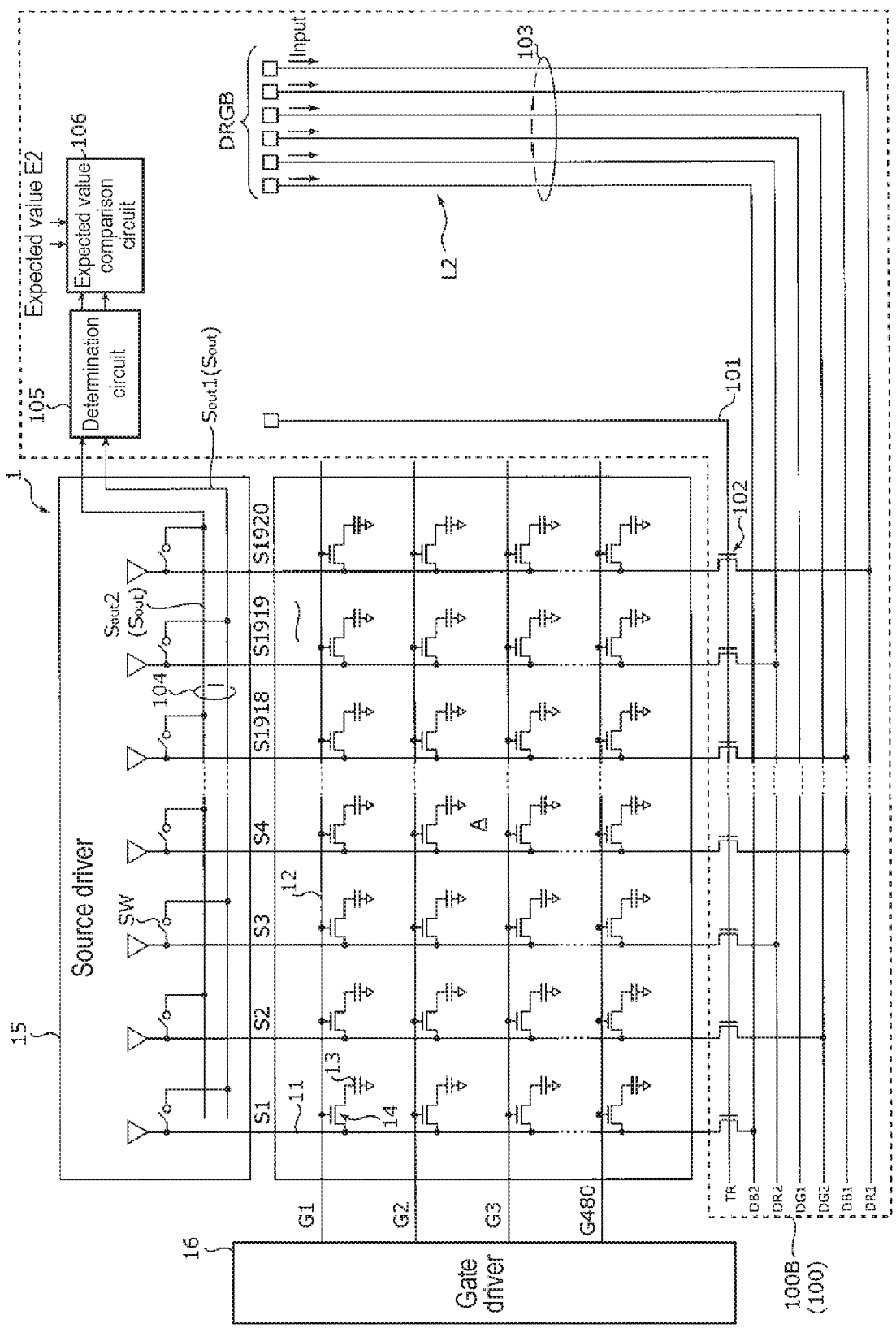
FIG. 9 is a diagram illustrating one example of a circuit configuration for inspecting for open abnormality and short-circuit abnormality in source lines.

FIG. 9 is a diagram illustrating one example of a circuit configuration for inspecting for open abnormality (open circuit) and short-circuit abnormality (short circuit) in source lines 11. As illustrated in FIG. 9, second failure inspection circuit 100B includes second wiring patterns L2, second determination circuit 105, and second expected value comparison circuit 106. At least one of second determination circuit 105 and second expected value comparison circuit 106 may be embedded in source driver 15.

Second wiring patterns L2 include second monitor input signal lines 103, second monitor output signal lines 104, second switching element 102, and control signal line 101. Second monitor input signal lines 103 receive second monitor input signals DRGB (DR1, DR2, DG1, DG2, DB1, and DB2) used for inspection of source lines 11. Second monitor output signal lines 104 output second monitor output signals Sout (Sout1, Sout2) based on second monitor input signals DRGB, or second monitor output signals Sout based on input signals from source driver 15, to second determination circuit 105. Second switching elements 102 are transistors each including a gate electrode, a source electrode, and a drain electrode. In second switching element 102, the gate electrode is connected to control signal line 101, the drain electrode is connected to second monitor input signal line 103, and the source electrode is connected to an end of source line 11 opposite to source driver 15. Based on switches SW disposed in source driver 15, second monitor output signals Sout based on second monitor input signals DRGB, or second monitor output signals Sout based on the input signals from source driver 15 are selectively output to second determination circuit 105.

Figure 10:
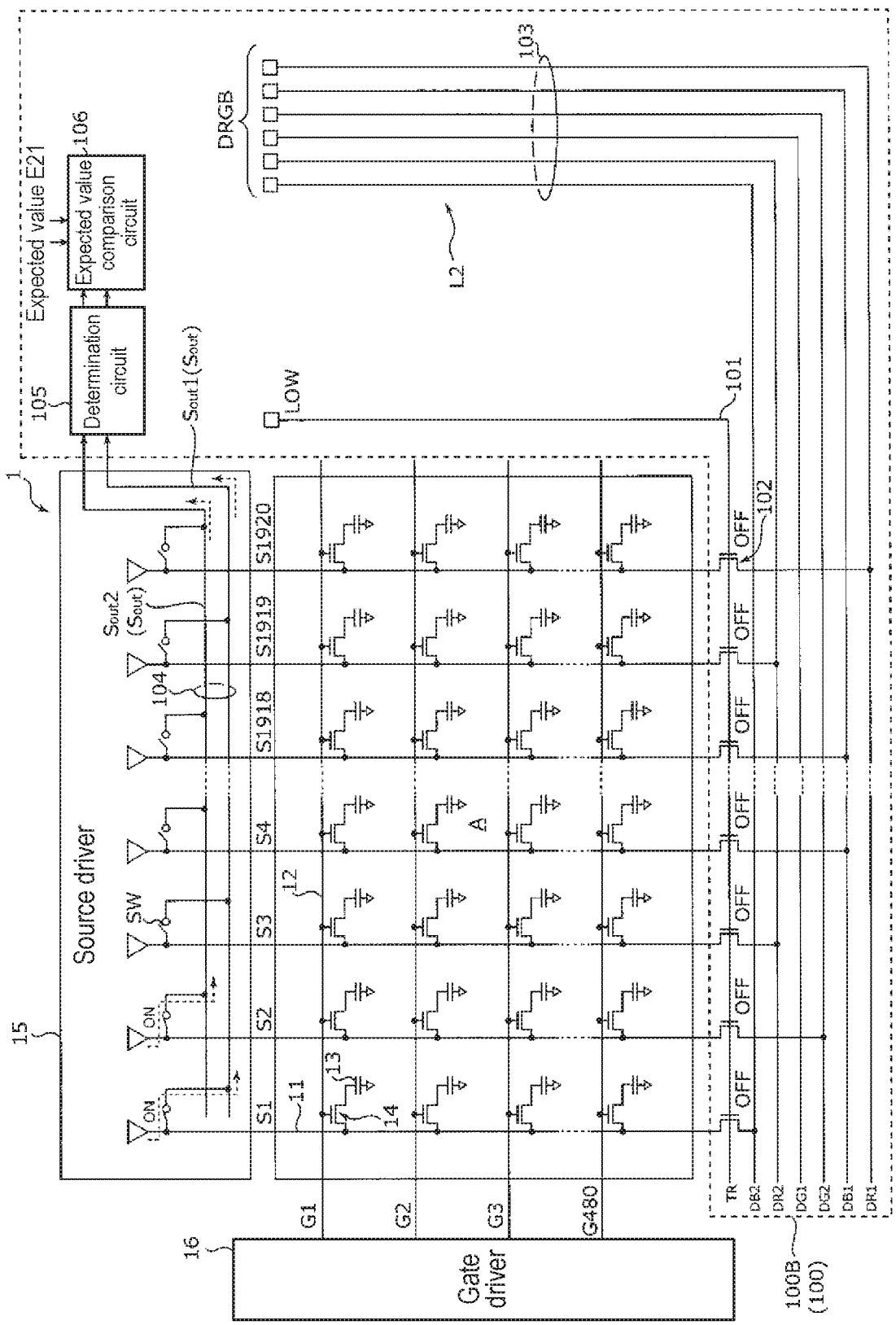
FIG. 10 is a diagram illustrating one example of an operation for detecting short-circuit abnormality in the source lines.
Figure 11:
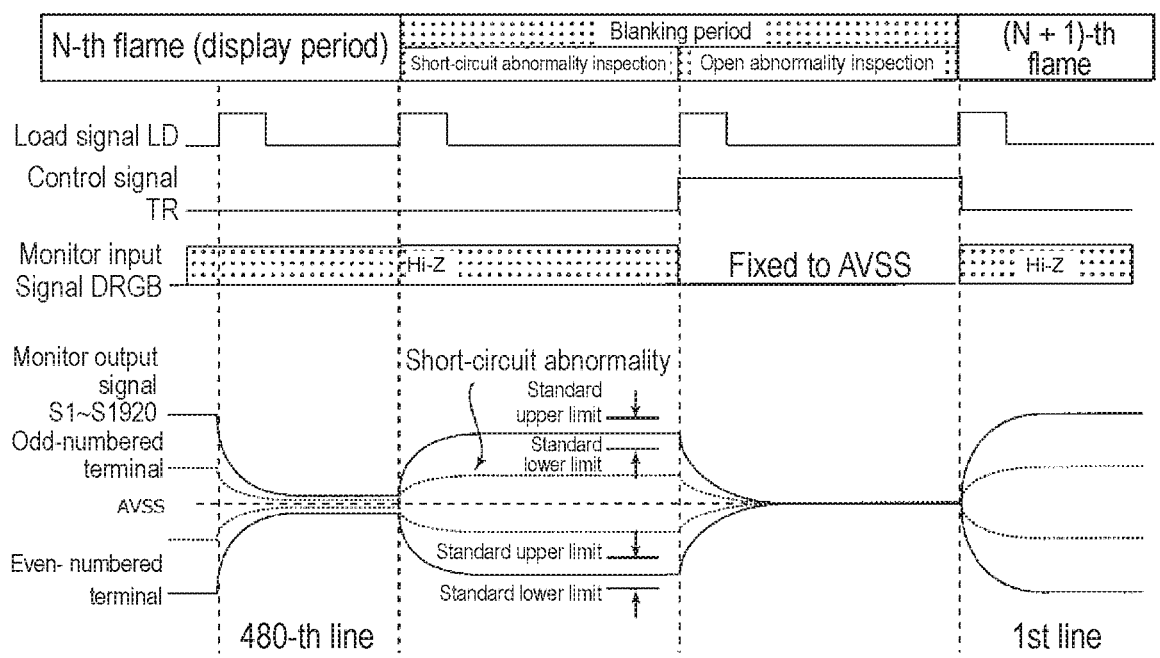
FIG. 11 is a timing chart illustrating one example of a failure inspection result (short-circuit abnormality) of the source lines.

FIG. 10 is a diagram illustrating one example of an operation for detecting short-circuit abnormality in source lines 11. FIG. 11 is a timing chart illustrating one example of a failure inspection result (short-circuit abnormality) of source lines 11. Monitor output signals illustrated in FIG. 11 indicate voltage levels input to second determination circuit 105. When voltage levels to be obtained when source lines 11 are normal are defined as second expected values E21, second expected value comparison circuit 106 determines short-circuit abnormality in source lines 11 by comparing voltage levels detected by second determination circuit 105 with second expected values E21. Inspection for short-circuit abnormality in source lines 11 is performed in the first half of the blanking period during the image display, for example.

As illustrated in FIG. 10, a voltage level of control signal TR from control signal line 101 is set to be "low". Accordingly second switching elements 102 are turned off. In this state, input signals are input from source driver 15 corresponding to source lines 11 to be inspected to second monitor output signal lines 104. Second monitor output signals Sout according to the input signals from source driver 15 are output to second determination circuit 105 through second monitor output signal lines 104.

As illustrated in FIG. 11, when short-circuit abnormality and open abnormality do not occur in source lines 11 to be inspected, if the input signals are input from source driver 15, voltage levels of second monitor output signals Sout are also turned to values according to the input signals from source driver 15. In a case of an example illustrated in FIG. 11, voltage levels of second monitor output signals Sout corresponding to odd-numbered source electrodes turn to "high".

Meanwhile, when short-circuit abnormality occurs in source lines 11, since desired voltages are not applied to second monitor output signal lines 104, the voltage levels of second monitor output signals Sout are out of a predetermined standard range (between a standard upper limit value and a standard lower limit value). This allows second expected value comparison circuit 106 to detect short-circuit abnormality in source lines 11.

Figure 12:
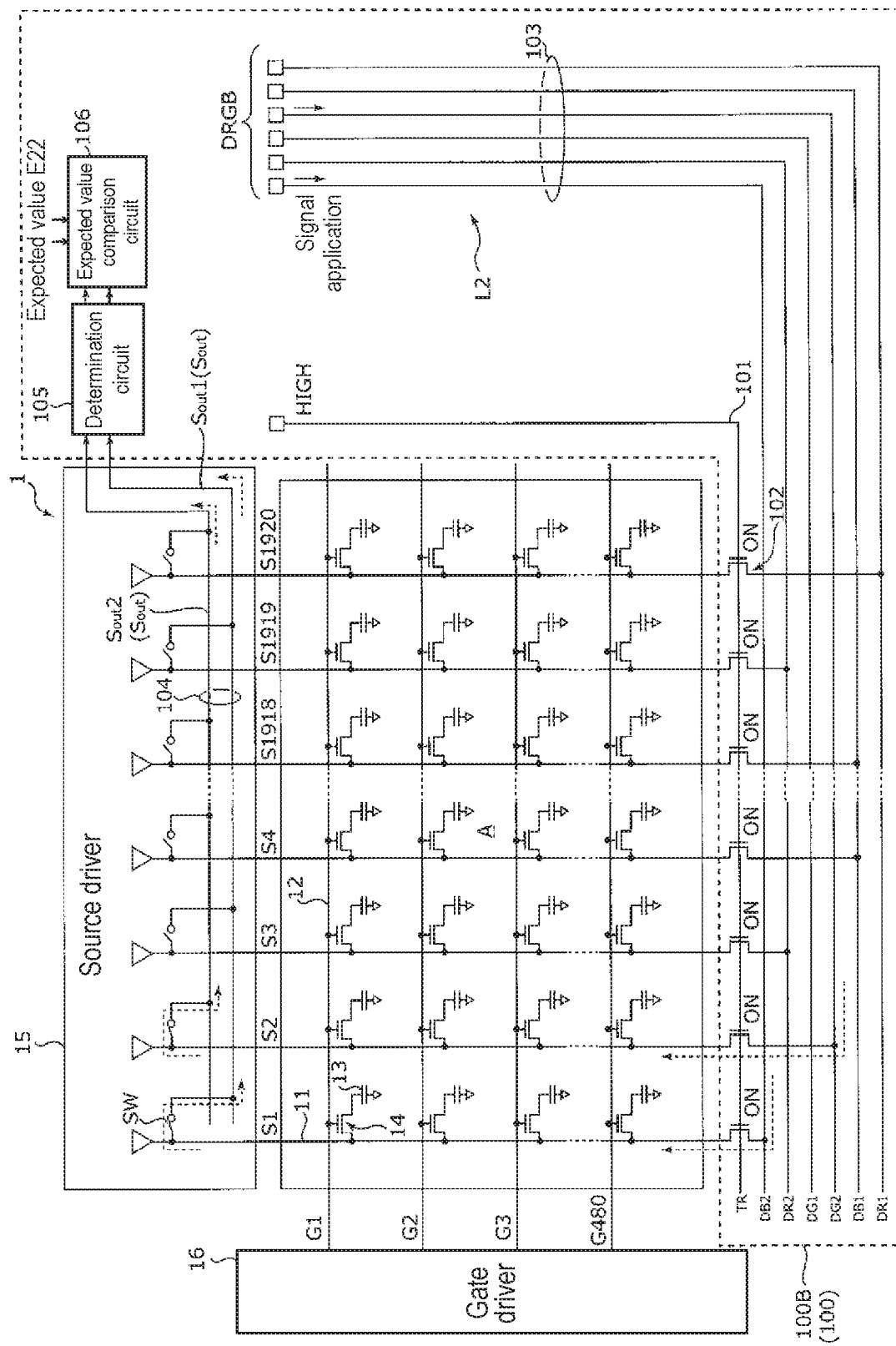
FIG. 12 is a diagram illustrating one example of an operation for detecting open abnormality in the source lines.
Figure 13:
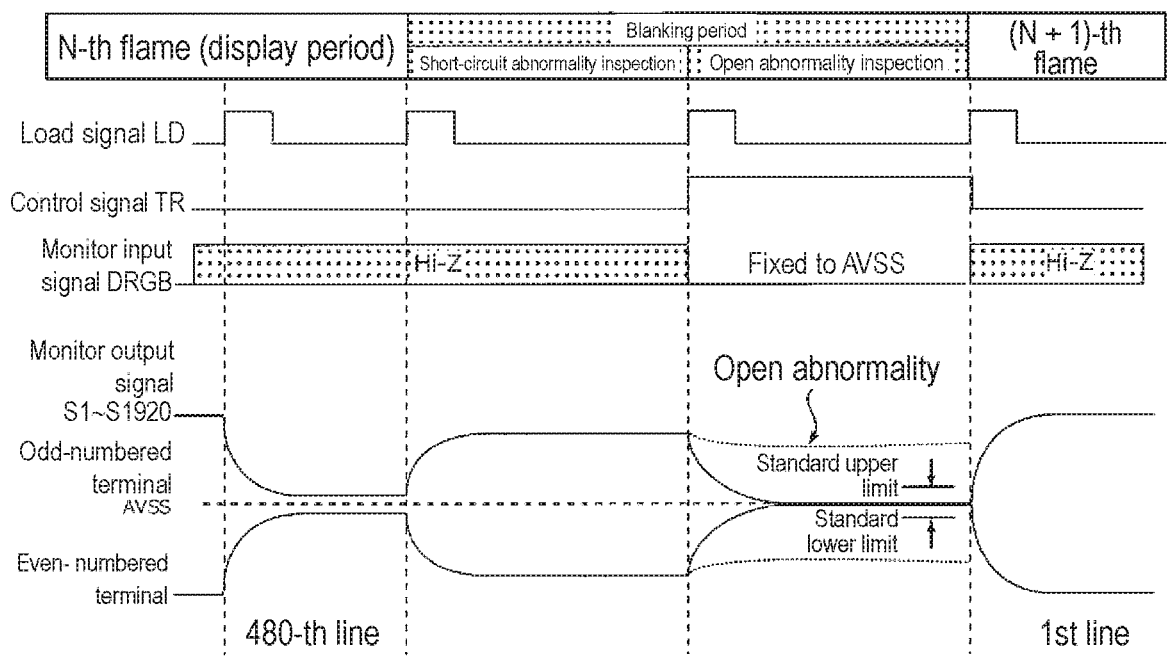
FIG. 13 is a timing chart illustrating one example of a failure inspection result (open abnormality) of the source lines.

FIG. 12 is a diagram illustrating one example of an operation for detecting open abnormality in source lines 11. FIG. 13 is a timing chart illustrating one example of a failure inspection result (open abnormality) of source lines 11. Monitor output signals illustrated in FIG. 13 indicate voltage levels detected in second determination circuit 105. When voltage levels to be obtained when source lines 11 are normal are defined as second expected values E22, second expected value comparison circuit 106 determines open abnormality in source lines 11 by comparing voltage levels detected by second determination circuit 105 with second expected values E22. Inspection for open abnormality in source lines 11 is performed in the second half of the blanking period during the image display, for example.

As illustrated in FIG. 12, the voltage level of control signal TR from control signal line 101 is set to be "high". Accordingly second switching elements 102 are turned on. With switches SW of source driver 15, source lines 11 to be inspected are connected to second monitor output signal lines 104. In this state, second monitor input signals DRGB are input via second monitor input signal lines 103 connected to source lines 11 to be inspected. Voltage levels of second monitor input signals DRGB are fixed to voltage level AVSS of an analog ground terminal. Second monitor output signals Sout based on second monitor input signals DRGB are output to second determination circuit 105 through second monitor output signal lines 104.

As illustrated in FIG. 13, when open abnormality does not occur in source lines 11 to be inspected, if second monitor input signals DRGB are input, voltage levels of second monitor output signals Sout become equivalent to voltage level AVSS of monitor input signals DRGB.

Meanwhile, when open abnormality occurs in source lines 11, since desired voltages are not applied to second monitor output signal lines 104, the voltage levels of second monitor output signals Sout are out of a predetermined standard range (between a standard upper limit value and a standard lower limit value). This allows second expected value comparison circuit 106 to detect open abnormality in source lines 11.

Note that, in the present exemplary embodiment, switches SW connected to S1 and S2 of source lines 11 are turned on at a time to inspect two source lines 11 at a time. Thereafter, switches SW to be turned on are sequentially switched, so that all source lines 11 are inspected. When inspection of all source lines 11 is not completed during one blanking period, remaining source lines 11 are inspected during the next and succeeding blanking periods. Note that a number of source lines to be inspected at a time varies according to a number of wires.

As described above, liquid crystal display LCD according to the first exemplary embodiment includes active matrix substrate 1 (first substrate), opposite substrate 2 (second substrate) disposed opposite to active matrix substrate 1, and liquid crystal panel P of an active matrix type having liquid crystal layer 3 sealed between active matrix substrate 1 and opposite substrate 2. Liquid crystal display LCD includes source lines 11 and gate lines 12, pixel electrodes 13, switching elements 14, source driver 15, gate driver 16, and failure inspection circuit 100. Source lines 11 and gate lines 12 are disposed in a lattice form. Pixel electrode 13 is disposed in a pixel region defined by source line 11 and gate line 12. Switching element 14 is disposed corresponding to pixel electrode 13. Source driver 15 drives source lines 11. Gate driver 16 drives gate lines 12. Failure inspection circuit 100 is connected to source lines 11 or gate lines 12, and performs inspection of source lines 11 or gate lines 12. Failure inspection circuit 100 includes monitor input signal lines 111, 103, monitor output signal lines 112, 104, determination circuits 114, 105 that respectively detect voltage levels of output signals from monitor output signal lines 112, 104, and expected value comparison circuits 115, 106 that respectively compare outputs from determination circuits 114, 105 with expected values E1, E2.

Liquid crystal display LCD can perform self-diagnosis of a failure of liquid crystal panel P with a simple circuit configuration. In a case where liquid crystal display LCD is applied to on-vehicle application, when a warning display region is incapable of displaying due to abnormality in source lines 11 or gate lines 12, liquid crystal display LCD operates such that the failure can be evaded based on the self-diagnosis, for example, the warning is displayed in a normal display region. This can achieve a fail-safe function. This eliminates necessity of disposition of the warning lamps, which can reduce a device cost.

Second Exemplary Embodiment

In a second exemplary embodiment, as the active matrix substrate of liquid crystal display LCD, active matrix substrate 1A having a failure inspection circuit different in configuration is applied, instead of active matrix substrate 1 according to the first exemplary embodiment.

Figure 14:
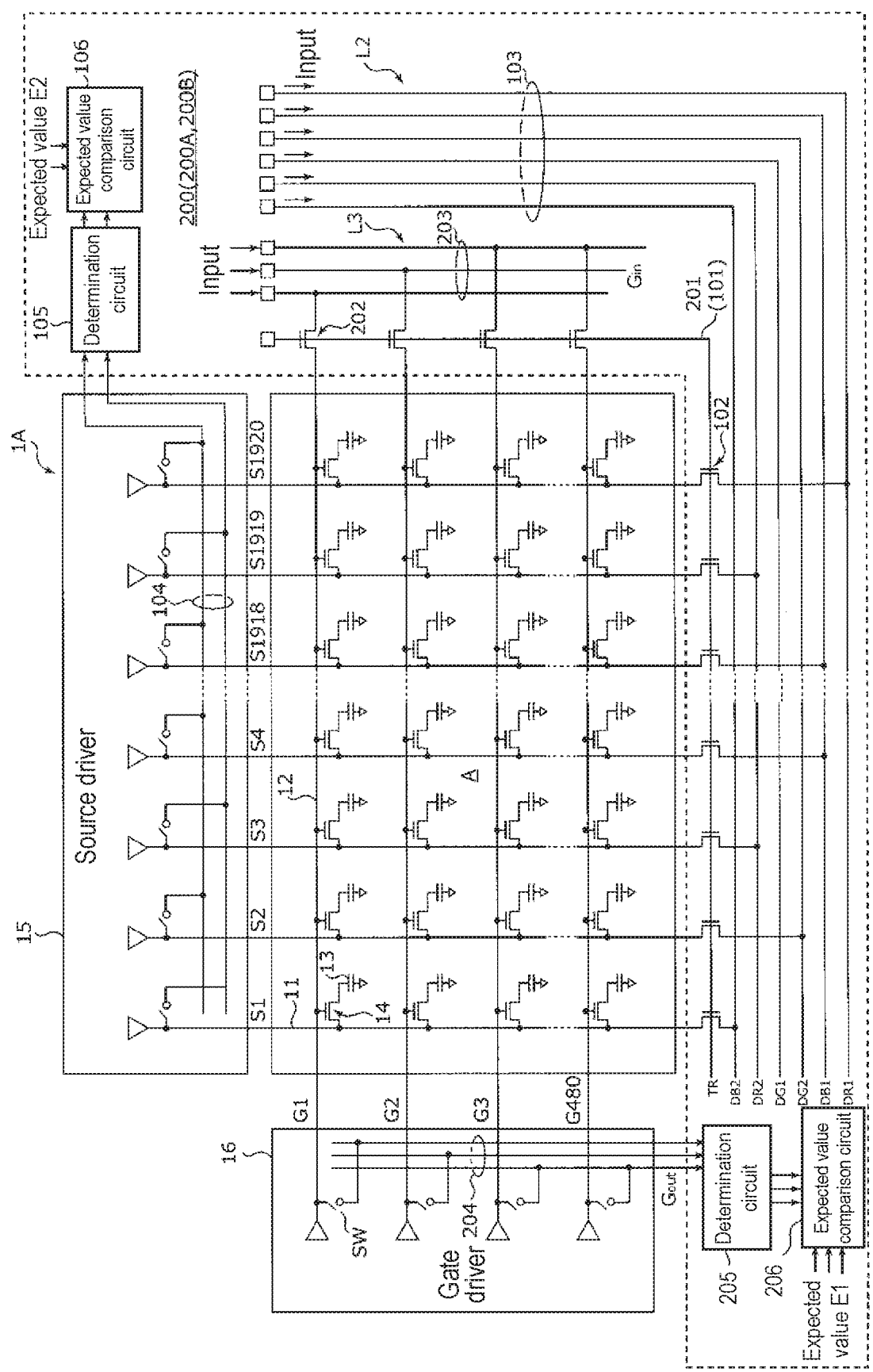
FIG. 14 is a diagram illustrating one example of a circuit configuration of an active matrix substrate according to a second exemplary embodiment.

FIG. 14 is a diagram illustrating one example of a circuit configuration of active matrix substrate 1A according to the second exemplary embodiment. As illustrated in FIG. 14, similarly to active matrix substrate 1 according to the first exemplary embodiment, active matrix substrate 1A includes source lines 11 (data lines) and gate lines 12 (scanning lines), pixel electrodes 13 (sub-pixel electrodes), switching elements 14, source driver 15, gate driver 16, and failure inspection circuit 200. Source lines 11 (data lines) and gate lines 12 (scanning lines) are disposed in a lattice form. Pixel electrode 13 (sub-pixel electrode) is disposed in a pixel region defined by source line 11 and gate line 12. Switching element 14 is disposed corresponding to pixel electrode 13. Source driver 15 drives source lines 11. Gate driver 16 drives gate lines 12. Configurations other than failure inspection circuit 200 are equivalent to the configurations of active matrix substrate 1 according to the first exemplary embodiment, whereby descriptions thereof will be omitted.

Failure inspection circuit 200 includes predetermined wiring patterns L2, L3, determination circuits 105, 205 that respectively detect voltage levels of output signals from wiring patterns L2, L3, expected value comparison circuits 106, 206 that respectively compare outputs from determination circuits 105, 205 with expected values. Failure inspection circuit 200 performs inspection of source lines 11 or gate lines 12 by using source driver 15 or gate driver 16. Comparison results of expected value comparison circuits 106, 206 are output to an LCD controller (not illustrated) or a computer. The LCD controller or the computer performs predetermined processing based on the comparison results.

In the present exemplary embodiment, failure inspection circuit 200 includes first failure inspection circuit 200A that performs inspection of gate lines 12, and second failure inspection circuit 200B that performs inspection of source lines 11. Second failure inspection circuit 200B is equivalent to second failure inspection circuit 100B of the first exemplary embodiment, whereby a description thereof will be omitted. Note that, in the present exemplary embodiment, inspection by first failure inspection circuit 200A for short-circuit abnormality in gate lines 12 is performed during an image display period, inspection by first failure inspection circuit 200A for open abnormality in gate lines 12 is performed out of the image display period, for example, at power-on, and inspection by second failure inspection circuit 200B for a failure in source lines 11 is performed by utilizing a blanking period between a plurality of image display periods.

As illustrated in FIG. 14, first failure inspection circuit 200A includes first wiring patterns L3, first determination circuit 205, and first expected value comparison circuit 206. At least one of first determination circuit 205 and first expected value comparison circuit 206 may be embedded in gate driver 16.

First wiring patterns L3 include first monitor input signal lines 203, first monitor output signal lines 204, first switching elements 202, and control signal line 201. First monitor input signal lines 203 receive first monitor input signals Gin (Gin1 to Gin3) for inspecting gate lines 12. First monitor output signal lines 204 output first monitor output signals Gout (Gout1 to Gout3) based on first monitor input signals Gin, or first monitor output signals Gout based on input signals from gate driver 16, to first determination circuit 205. First switching elements 202 are transistors each including a gate electrode, a source electrode, and a drain electrode. In first switching element 202, the gate electrode is connected to control signal line 201, the drain electrode is connected to first monitor input signal line 203, and the source electrode is connected to an end of gate line 12 opposite to gate driver 16. Based on switches SW disposed in gate driver 16, first monitor output signals Gout based on first monitor input signals Gin, or first monitor output signals Gout based on the input signals from gate driver 16 are selectively output to first determination circuit 205.

Figure 15:
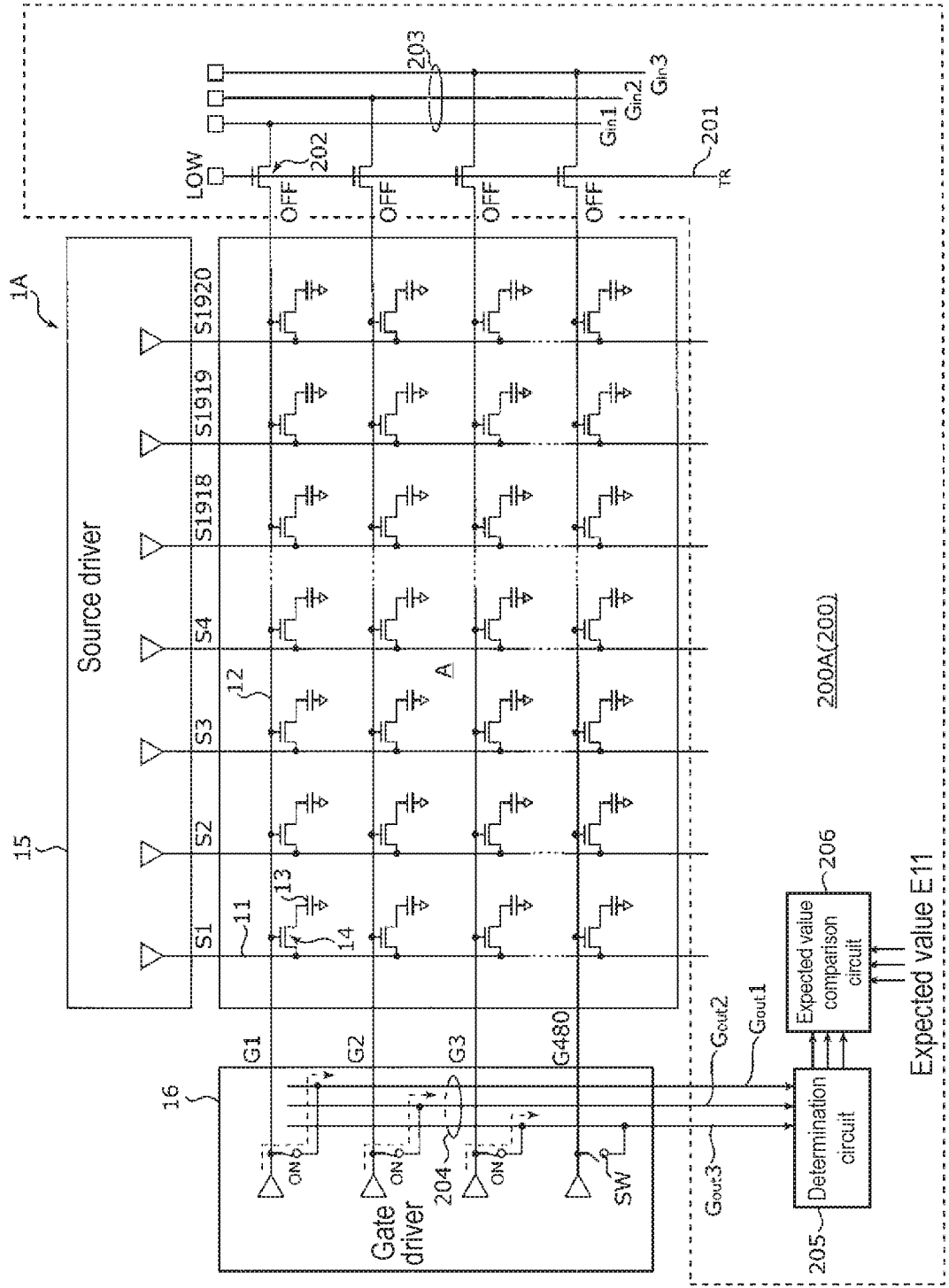
FIG. 15 is a diagram illustrating one example of an operation for detecting short-circuit abnormality in the gate lines.

FIG. 15 is a diagram illustrating one example of an operation for detecting short-circuit abnormality in gate lines 12. When voltage levels to be obtained when gate lines 12 are normal are defined as first expected values E11, first expected value comparison circuit 206 determines short-circuit abnormality in gate lines 12 by comparing voltage levels detected by first determination circuit 205 with first expected values E11. Note that inspection for short-circuit abnormality in gate lines 12 is performed by utilizing an operation for driving gate lines 12 during the image display, for example.

As illustrated in FIG. 15, a voltage level of control signal TR from control signal line 201 is set to be "low". Accordingly first switching elements 202 are turned off. In this state, input signals are input from source driver 16 corresponding to gate lines 12 to be inspected to first monitor output signal lines 204. First monitor output signals Gout according to the input signals from gate driver 16 are output to first determination circuit 205 through first monitor output signal lines 204.

When short-circuit abnormality does not occur in gate lines 12 to be inspected, if the input signals are input from gate driver 16, voltage levels of first monitor output signals Gout are also turned to values according to the input signals from gate driver 16.

Meanwhile, when short-circuit abnormality occurs in gate lines 12, since desired voltages are not applied to first monitor output signal lines 204, the voltage levels of first monitor output signals Gout are out of a predetermined standard range (between a standard upper limit value and a standard lower limit value). This allows first expected value comparison circuit 206 to detect short-circuit abnormality in gate lines 12.

Figure 16:
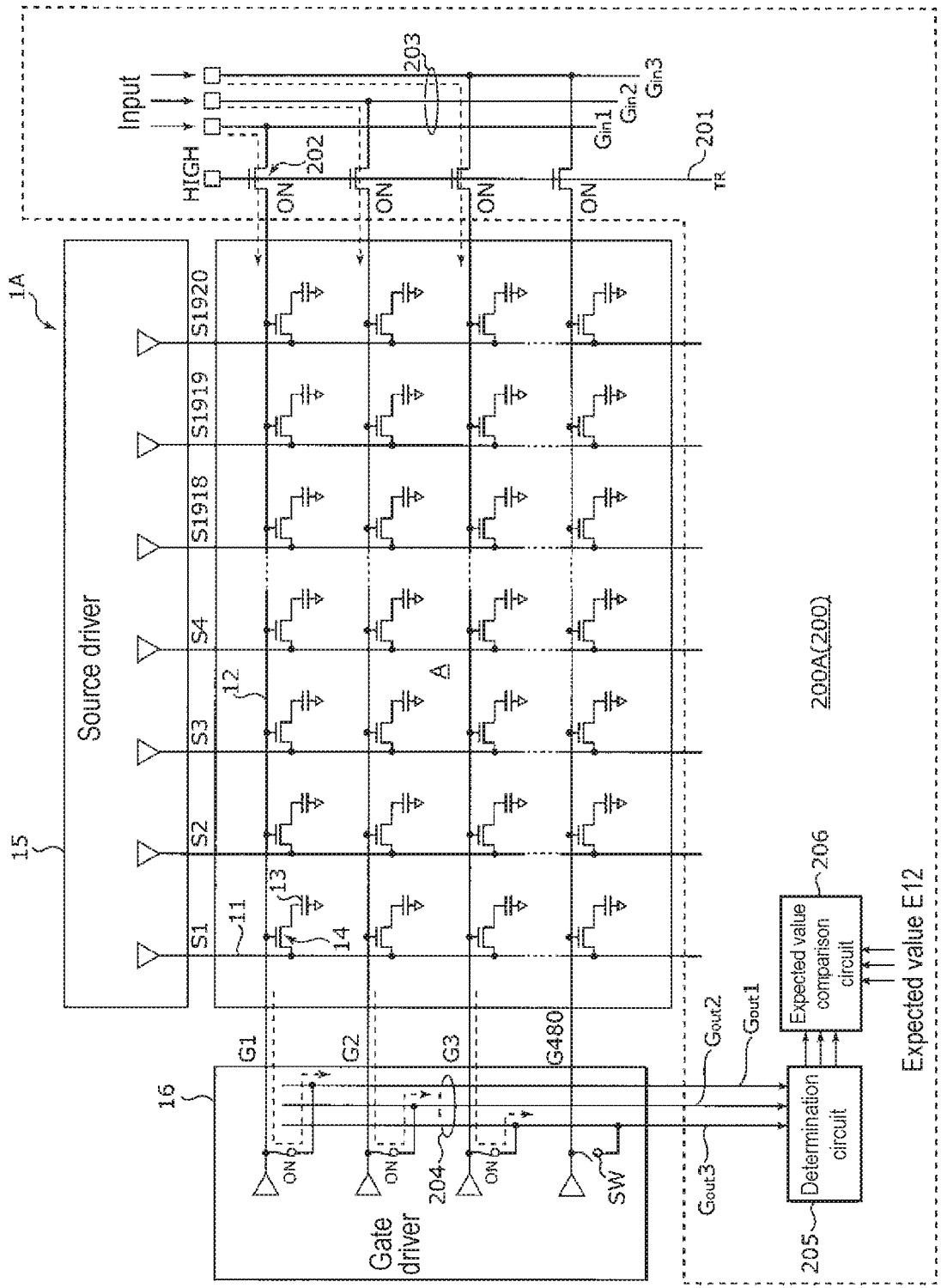
FIG. 16 is a diagram illustrating one example of an operation for detecting open abnormality in the gate lines.

FIG. 16 is a diagram illustrating one example of an operation for detecting open abnormality in gate lines 12. When voltage levels to be obtained when gate lines 12 are normal are defined as first expected values E12, first expected value comparison circuit 206 determines open abnormality in gate lines 12 by comparing voltage levels detected by first determination circuit 205 with first expected values E12. Note that inspection for open abnormality in gate lines 12 is performed out of the image display period, for example, at power-on.

As illustrated in FIG. 16, the voltage level of control signal TR from control signal line 201 is set to be "high". Accordingly first switching elements 202 are turned on. With switches SW of gate driver 16, gate lines 12 to be inspected are connected to first monitor output signal lines 204. In this state, first monitor input signals Gin are input via first monitor input signal lines 203 connected to gate lines 12 to be inspected. First monitor output signals Gout based on first monitor input signals Gin are output to first determination circuit 205 through first monitor output signal lines 204.

When open abnormality does not occur in gate lines 12 to be inspected, if first monitor input signals Gin are input, voltage levels of first monitor output signals Gout become equivalent to voltage levels of monitor input signals Gin.

Meanwhile, when open abnormality occurs in gate lines 12, since desired voltages are not applied to first monitor output signal lines 204, the voltage levels of first monitor output signals Gout are out of a predetermined standard range (between a standard upper limit value and a standard lower limit value). This allows first expected value comparison circuit 206 to detect open abnormality in gate lines 12.

Note that, in the present exemplary embodiment, switches SW connected to G1 to G3 of gate lines 12 are turned on at a time to inspect three gate lines 12 at a time. Thereafter, switches SW to be turned on are sequentially switched, so that all gate lines 12 are inspected. Note that a number of gate lines 12 to be inspected at a time varies according to a number of wires.

As described above, liquid crystal display LCD according to the second exemplary embodiment includes active matrix substrate 1A (first substrate), opposite substrate 2 (second substrate) disposed opposite to active matrix substrate 1A, and liquid crystal panel P of an active matrix type having liquid crystal layer 3 sealed between active matrix substrate 1A and opposite substrate 2. Liquid crystal display LCD includes source lines 11 and gate lines 12, pixel electrodes 13, switching elements 14, source driver 15, gate driver 16, and failure inspection circuit 200. Source lines 11 and gate lines 12 are disposed in a lattice form. Pixel electrode 13 is disposed in a pixel region defined by source line 11 and gate line 12. Switching element 14 is disposed corresponding to pixel electrode 13. Source driver 15 drives source lines 11. Gate driver 16 drives gate lines 12. Failure inspection circuit 200 is connected to source lines 11 or gate lines 12, and performs inspection of source lines 11 or gate lines 12. Failure inspection circuit 200 includes monitor input signal lines 203, 103, monitor output signal lines 204, 104, determination circuits 205, 105 that respectively detect voltage levels of output signals from monitor output signal lines 204, 104, and expected value comparison circuits 206, 106 that respectively compare outputs from determination circuits 205, 105 with expected values E1, E2.

Liquid crystal display LCD according to the second exemplary embodiment can perform self-diagnosis of a failure of liquid crystal panel P with a simple circuit configuration, similarly to the first exemplary embodiment. In a case where liquid crystal display LCD is applied to on-vehicle application, when a warning display region is incapable of displaying due to abnormality in source lines 11 or gate lines 12, liquid crystal display LCD operates such that the failure can be evaded based on the self-diagnosis, for example, the warning is displayed in a normal display region. This can achieve a fail-safe function. This eliminates necessity of disposition of the warning lamps, which can reduce a device cost.

Third Exemplary Embodiment

Figure 17:
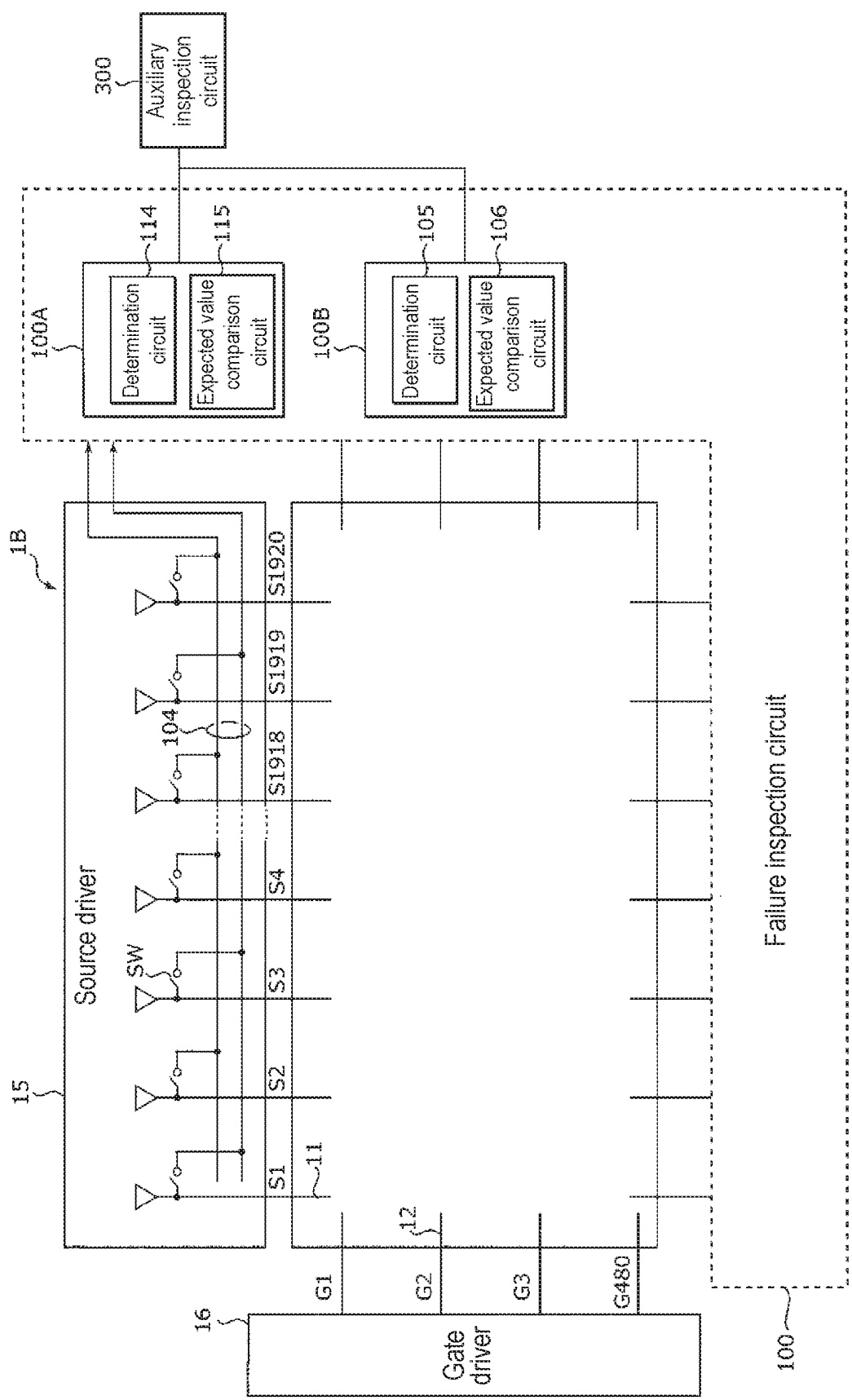
FIG. 17 is a diagram illustrating one example of a circuit configuration of an active matrix substrate according to a third exemplary embodiment.

FIG. 17 is a diagram illustrating one example of a circuit configuration of active matrix substrate 1B according to a third exemplary embodiment. Active matrix substrate 1B illustrated in FIG. 17 is configured by adding auxiliary inspection circuit 300 that inspects failure inspection circuit 100 to active matrix substrate 1 according to the first exemplary embodiment.

Auxiliary inspection circuit 300 is connected to first failure inspection circuit 100A (first determination circuit 114, first expected value comparison circuit 115) that inspects gate lines 12 and second failure inspection circuit 100B (second determination circuit 105, second expected value comparison circuit 106) that inspects source lines 11. Auxiliary inspection circuit 300 thus disposed enables performance of inspection of failure inspection circuit 100 itself, thereby improving reliability in failure detection of liquid crystal display LCD.

Figure 18:
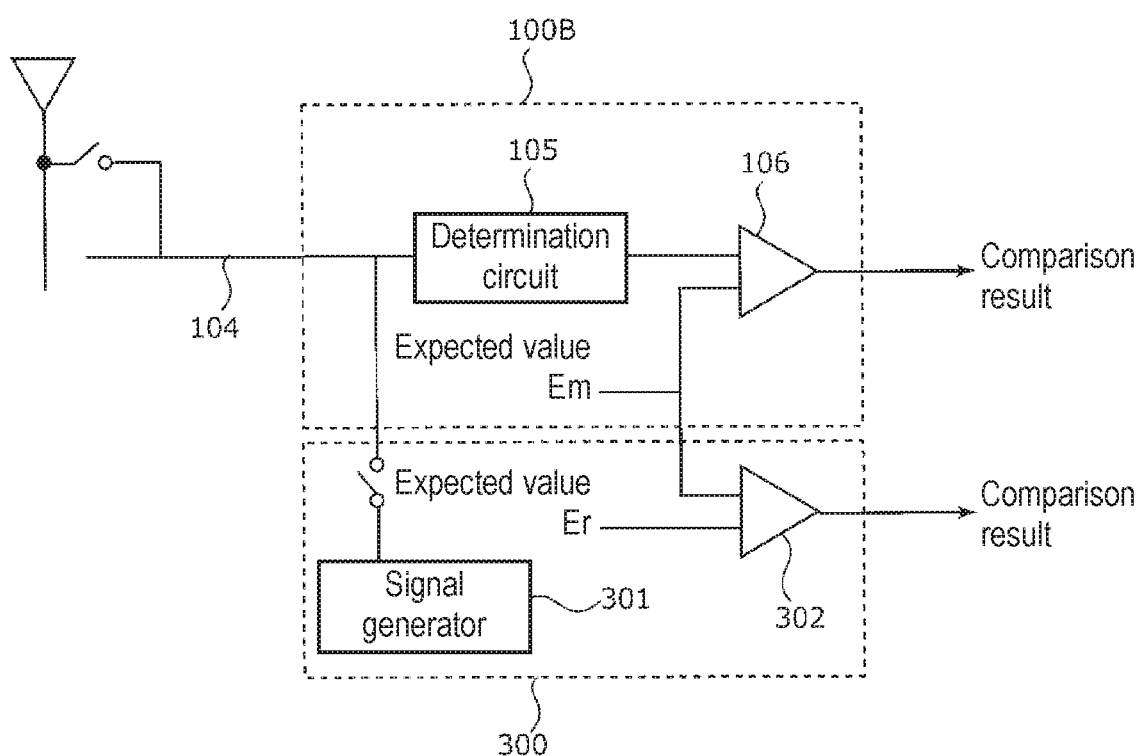
FIG. 18 is a diagram illustrating one example of a circuit configuration of an auxiliary inspection circuit.

FIG. 18 is a diagram illustrating one example of a circuit configuration of auxiliary inspection circuit 300. FIG. 18 illustrates a case where auxiliary inspection circuit 300 inspects second failure inspection circuit 100B. Note that, when first failure inspection circuit 100A is inspected, the same configuration can be applied to auxiliary inspection circuit 300.

As illustrated in FIG. 18, auxiliary inspection circuit 300 includes signal generator 301 and comparison circuit 302.

Signal generator 301 outputs a monitor output signal for inspecting whether second expected value comparison circuit 106 normally operates. As illustrated in FIG. 18, a switch may be inserted between signal generator 301 and monitor output signal line 104 to electrically separate signal generator 301 from monitor output signal line 104. The monitor output signal output from signal generator 301 may be any signal pattern, and for example, a toggle pattern that repeats High and Low may be used.

In a regular failure inspection (inspection of source lines 11), the monitor output signal is output to second failure inspection circuit 100B through source lines 11 to be inspected. However, in inspection of second failure inspection circuit 100B, the monitor output signal is directly output from signal generator 301 to second failure inspection circuit 100B. The monitor output signal from signal generator 301 is input to second failure inspection circuit 100B (second determination circuit 105) through monitor output signal line 104.

Second determination circuit 105 detects a voltage level of the monitor output signal from signal generator 301. Second expected value comparison circuit 106 compares an output of second determination circuit 105 with expected value Em for the monitor output signal. Expected value Em is a value indicating the voltage level of the monitor output signal, and is generated by an expected value generation circuit (not illustrated) that generates expected values E21, E22 for inspecting source lines 11. A comparison result of second expected value comparison circuit 106 is output to an LCD controller (not illustrated) or a computer. The LCD controller or the computer performs predetermined processing based on the comparison result.

When second failure inspection circuit 100B normally operates, a comparison result indicating that an output of second determination circuit 105 coincides with expected value Em for the monitor output signal is output. When second failure inspection circuit 100B does not normally operate, a comparison result indicating that the output of second determination circuit 105 does not coincide with expected value Em is output. With this configuration, whether second failure inspection circuit 100B normally operates can be detected.

When an abnormal operation of second failure inspection circuit 100B is detected, as a factor of the abnormal operation, abnormality in second expected value comparison circuit 106 or abnormality in the expected value generation circuit (not illustrated) that has generated expected value Em can be considered.

Comparison circuit 302 compares expected value Em for the monitor output signal with reference expected value Er for determining propriety of expected value Em. Reference expected value Er is a value indicating the voltage level of the monitor output signal, and is generated by an expected value generation circuit (not illustrated) different from the above-described expected value generation circuit that generates expected value Em. A comparison result of comparison circuit 302 is output to the LCD controller (not illustrated) or the computer, similarly to the comparison result of expected value comparison circuit 106.

When expected value Em is a correct value, a comparison result indicating that expected value Em for the monitor output signal coincides with reference expected value Er is output. When expected value Em is not the correct value, a comparison result indicating that expected value Em does not coincide with reference expected value Er is output. This can determine the propriety of expected value Em, that is, whether abnormality has occurred in second expected value comparison circuit 106 or the expected value generation circuit (not illustrated) that has generated expected value Em.

In the same manner, with auxiliary inspection circuit 300, whether first failure inspection circuit 100A normally operates can also be determined.

In the present exemplary embodiment, an example in which auxiliary inspection circuit 300 that inspects failure inspection circuit 100 is added to active matrix substrate 1 according to the first exemplary embodiment is described. However auxiliary inspection circuit 300 can also be added to active matrix substrate 1A according to the second exemplary embodiment.

Although the invention made by the present inventors has been specifically described above based on the exemplary embodiments, the present invention is not limited to the above exemplary embodiments, but can be modified without departing from the gist of the present invention.

For example, in the exemplary embodiments, first failure inspection circuit 100A, 200A for inspecting a failure in gate lines 12 and second failure inspection circuit 100B, 200B for inspecting a failure in source lines 11 are provided. However any one of those failure inspection circuits may be provided. In the exemplary embodiments, a case where source driver 15, gate driver 16, and failure inspection circuit 100, 200 are mounted on the glass substrate sealing liquid crystal layer 3 has been described. However, source driver 15, gate driver 16, and failure inspection circuit 100, 200 may be mounted on a circuit substrate different from the glass substrate, and may be connected to a circuit on the glass substrate.

Further, for example, a number of pairs of first monitor input signal lines 111, 203 and first monitor output signal lines 112, 204 is not limited to three. The number of pairs can appropriately be designed according to, for example, a specification of liquid crystal panel P or required inspection time. The same applies to a number of lines of second monitor input signal lines 103 and second monitor output signal lines 104.

Further, the failure inspection of liquid crystal display LCD may be performed when liquid crystal display LCD does not operate, instead of during the image display. For example, at power-on of liquid crystal display LCD, after the failure inspection of all of source lines 11 and gate lines 12 is performed, the image display may be started. Further, for example, a failure inspection mode that is provided for a failure of liquid crystal display LCD and can perform the failure inspection at any time may be provided. In this case, since a portion of the failure is easily identified, an inspection process can be simplified.

It should be construed that the exemplary embodiments disclosed herein are illustrative in all aspects, and are not restrictive. The scope of the present invention is represented by the scope of the claims and not by the above description, and it is intended that all modifications within the sense and scope equivalent to the claims are involved in the scope of the present invention.

INDUSTRIAL APPLICABILITY

The present invention is useful for a liquid crystal display having a liquid crystal panel of an active matrix type.

REFERENCE MARKS IN THE DRAWINGS 1, 1A, 1B: active matrix substrate (first substrate)
2: opposite substrate (second substrate)
3: liquid crystal layer
4, 5: polarizing plate
11: source line
12: gate line
13: pixel electrode
14: switching element
15: source driver
16: gate driver
100, 200: failure inspection circuit
100A, 200A: failure inspection circuit (first failure inspection circuit)
100B, 200B: failure inspection circuit (second failure inspection circuit)
101, 201: control signal line
102: switching element (second switching element)
103: monitor input signal line (second monitor input signal line)
104: monitor output signal line (second monitor output signal line)
105: determination circuit (second determination circuit)
106: expected value comparison circuit (second expected value comparison circuit)
111, 203: monitor input signal line (first monitor input signal line)
112, 204: monitor output signal line (first monitor output signal line)
113, 202: switching element (first switching element)
114, 205: determination circuit (first determination circuit)
115, 206: expected value comparison circuit (first expected value comparison circuit)
300: auxiliary inspection circuit
301: signal generator
302: comparison circuit
Gin: monitor input signal (first monitor input signal)
Gout: monitor output signal (first monitor output signal)
LCD: liquid crystal display
L1: wiring pattern (first wiring pattern)
L2: wiring pattern (second wiring pattern)
L3: wiring pattern (first wiring pattern)
P: liquid crystal panel
BL: backlight
SW: switch
DRGB: monitor input signal (second monitor input signal)
Sout, Sout1, Sout2: monitor output signal (second monitor output 15 signal)
D1: display screen
SM: speed meter
TM: tachometer
WI: warning icon
WL: warning lamp

The invention claimed is:

1. A liquid crystal display, comprising:
a liquid crystal panel of an active matrix type including a first substrate, a second substrate disposed opposite to the first substrate, and a liquid crystal layer sealed between the first substrate and the second substrate;
a source line and a gate line disposed in a lattice form;
a pixel electrode disposed in a pixel region defined by the source line and the gate line;

a switching element disposed corresponding to the pixel electrode;
a source driver that drives the source line;
a gate driver that drives the gate line; and
a failure inspection circuit that is selectively connected to the source line to perform failure inspection of the source line, and is selectively connected to the gate line to perform failure inspection of the gate line,
wherein the failure inspection circuit includes
a monitor input signal line,
a monitor output signal line,
a determination circuit that detects a voltage level of an output signal from the monitor output signal line, and
an expected value comparison circuit that compares an output from the determination circuit with an expected value,
wherein the source driver, the gate driver, and the failure inspection circuit are mounted on the first substrate or the second substrate,
wherein the failure inspection circuit selectively performs failure inspection of the source line during a blanking period between a plurality of image display periods, and
wherein the failure inspection circuit selectively performs failure inspection of the gate line based on the output signal when a gate signal from the gate driver is applied during an image display period.

2. The liquid crystal display according to claim 1, wherein the failure inspection circuit includes a first failure inspection circuit that performs failure inspection of the gate line, and
the first failure inspection circuit includes
a first monitor input signal line that receives a first monitor input signal for inspecting the gate line,
a first monitor output signal line that outputs a first monitor output signal based on the first monitor input signal as the output signal,
a first determination circuit that detects a voltage level of the output signal from the first monitor output signal line,
a first expected value comparison circuit that compares an output from the first determination circuit with a first expected value, and
a first switching element, a gate electrode of which is connected to the gate line, one of a drain electrode and a source electrode of which is connected to the first monitor input signal line, and another of the drain electrode and the source electrode of which is connected to the first monitor output signal line.

3. The liquid crystal display according to claim 1, wherein the failure inspection circuit includes a first failure inspection circuit that performs failure inspection of the gate line, and
the first failure inspection circuit includes
a first monitor input signal line that receives a first monitor input signal for inspecting the gate line,
a first monitor output signal line that outputs, as the output signal, a first monitor output signal based on the first monitor input signal or a first monitor input signal based on an input signal from the gate driver,
a first determination circuit that detects a voltage level of the output signal from the first monitor output signal line,
a first expected value comparison circuit that compares an output from the first determination circuit with a first expected value,
a first switching element, one of a drain electrode and a source electrode of which is connected to the first monitor input signal line, and another of the drain electrode and the source electrode of which is connected to the gate line, and
a control signal line that is connected to a gate electrode of the first switching element, and that switches on and off of the first switching element.

4. The liquid crystal display according to claim 2, wherein at least one of the first determination circuit and the first expected value comparison circuit is embedded in the gate driver.

5. The liquid crystal display according to claim 1, wherein the failure inspection circuit includes a second failure inspection circuit that performs failure inspection of the source line, and
the second failure inspection circuit includes
a second monitor input signal line that receives a second monitor input signal for inspecting the source line,
a second monitor output signal line that outputs, as the output signal, one of a second monitor output signal based on the second monitor input signal and a second monitor output signal based on an input signal from the source driver,
a second determination circuit that detects a voltage level of the output signal from the second monitor output signal line,
a second expected value comparison circuit that compares an output from the second determination circuit with a second expected value,
a second switching element, one of a drain electrode and a source electrode of which is connected to the second monitor input signal line, and another of the drain electrode and the source electrode of which is connected to the source line, and
a control signal line that is connected to a gate electrode of the second switching element, and that switches on and off of the second switching element.

6. The liquid crystal display according to claim 5, wherein at least one of the second determination circuit and the second expected value comparison circuit is embedded in the source driver.

7. The liquid crystal display according to claim 1, further comprising:
an auxiliary inspection circuit that performs inspection of the failure inspection circuit.

8. The liquid crystal display according to claim 7, wherein the auxiliary inspection circuit includes a signal generator that outputs a monitor output signal to the failure inspection circuit,
the determination circuit detects a voltage level of the monitor output signal, and
the expected value comparison circuit compares an output from the determination circuit with an expected value for the monitor output signal.

9. The liquid crystal display according to claim 8, wherein the auxiliary inspection circuit includes a comparison circuit that compares the expected value for the monitor output signal with a reference expected value for determining propriety of the expected value for the monitor output signal.

10. A failure inspection method of the liquid crystal display according to claim 3, the failure inspection method comprising:

performing failure inspection for open abnormality in the gate line out of an image display period.

* * * * *